(12) United States Patent
Didey et al.

(10) Patent No.: US 10,207,797 B2
(45) Date of Patent: Feb. 19, 2019

(54) WHEEL AND GEAR ASSEMBLY

(71) Applicant: AIRBUS OPERATIONS LIMITED, Bristol (GB)

(72) Inventors: Arnaud Didey, Bristol (GB); Fraser Wilson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 330 days.

(21) Appl. No.: 15/125,639

(22) PCT Filed: Mar. 13, 2015

(86) PCT No.: PCT/GB2015/050740
§ 371 (c)(1),
(2) Date: Sep. 13, 2016

(87) PCT Pub. No.: WO2015/136302
PCT Pub. Date: Sep. 17, 2015

(65) Prior Publication Data
US 2017/0001720 A1    Jan. 5, 2017

(30) Foreign Application Priority Data

Mar. 14, 2014 (GB) .................................. 1404636.1

(51) Int. Cl.
*B64C 25/40*    (2006.01)
*B64C 25/34*    (2006.01)

(52) U.S. Cl.
CPC ............ *B64C 25/405* (2013.01); *B64C 25/34* (2013.01); *Y02T 50/823* (2013.01)

(58) Field of Classification Search
CPC ...... B64C 25/405; B64C 25/34; Y02T 50/823
See application file for complete search history.

(56) References Cited

U.S. PATENT DOCUMENTS

| | | | |
|---|---|---|---|
| 9,415,865 B2 * | 8/2016 | Mazarguil | B64C 25/405 |
| 9,540,098 B2 * | 1/2017 | Mazarguil | B64C 25/34 |
| 9,738,377 B2 * | 8/2017 | Mazarguil | B64C 25/405 |
| 2006/0065779 A1 | 3/2006 | McCoskey et al. | |
| 2012/0126053 A1 | 5/2012 | Christensen et al. | |
| 2012/0153075 A1 | 6/2012 | Wilson et al. | |
| 2012/0312112 A1 | 12/2012 | Tizac | |
| 2013/0002007 A1 | 1/2013 | Vallejo et al. | |
| 2013/0233969 A1 * | 9/2013 | Charles | B64C 25/36 |
| | | | 244/103 R |
| 2014/0158820 A1 | 6/2014 | Wilson et al. | |

(Continued)

FOREIGN PATENT DOCUMENTS

| | | |
|---|---|---|
| EP | 2455634 A1 | 5/2012 |
| EP | 2527249 A1 | 11/2012 |
| EP | 2639160 A2 | 9/2013 |

(Continued)

OTHER PUBLICATIONS

International Search Report and Written Opinion of the ISA dated May 29, 2015 International No. PCT/GB2015/050740.

*Primary Examiner* — Valentina Xavier
(74) *Attorney, Agent, or Firm* — Nixon & Vanderhye P.C.

(57) ABSTRACT

A wheel assembly is disclosed, in which a ring gear is movably mounted to the rim of the wheel, so that torque can be transmitted between wheel and rim, while the ring gear is isolated from deformations induced in the wheel rim.

19 Claims, 10 Drawing Sheets

(56) References Cited

U.S. PATENT DOCUMENTS

2014/0245853 A1  9/2014  Didey
2015/0210385 A1  7/2015  Didey

FOREIGN PATENT DOCUMENTS

WO  2011023505 A2  3/2011
WO  2014023939 A1  2/2014
WO  2014023941 A1  2/2014

\* cited by examiner

WHEEL AND GEAR ASSEMBLY

RELATED APPLICATIONS

The present application is a National Phase of International Application No. PCT/GB2015/050740, filed Mar. 13, 2015, which claims priority from Great Britain Application No. 1404636.1, filed Mar. 14, 2104.

FIELD OF THE INVENTION

The present invention relates to a mounting arrangement for mounting a ring gear or sprocket to a hub of an aircraft wheel.

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

There is therefore a need for a drive system to power the wheels of an aircraft landing gear during ground taxi operations. There is also a desire to use such a drive system to pre-spin the wheels prior to landing, so that the wheels are already spinning at, or near, their initial landing speed on touch down. Such pre-landing spin-up is perceived to reduce tyre wear on landing, and reduce loads transmitted to the landing gear during landing.

Several autonomous ground taxi systems for both driving the wheels while the aircraft is on the ground and spinning them up prior to landing have been proposed in recent years.

An example is disclosed in US2006/0065779, which proposes a powered nose aircraft wheel system in which a clutch is used to switch between a mode in which the wheel can spin freely and a mode in which the wheel can be driven by an electric motor. The clutch can also operate to enable the motor to pre-spin the wheel prior to landing.

Such prior art systems are typically limited to nose landing gears because they take up too much space to be able to be integrated into a main landing gear in which much of the space around the wheels is taken up by braking systems. However, nose landing gears only support a small fraction of the vertical loads supported by the landing gear as a whole during ground taxi operations (approximately 5% of the aircraft weight). There may therefore be insufficient traction between a driven nose landing gear wheel and the ground to enable reliable aircraft ground taxiing. This is a particular concern when the aircraft centre of gravity is towards its aft limit and when the ground surface is slippery.

A prior art arrangement which is not restricted to nose landing gears is described in WO2011/023505. The disclosed system uses an actuator to move a pinion gear in and out of driving engagement with a ring gear mounted to the wheel hub.

SUMMARY OF THE INVENTION

A first aspect of the invention provides a wheel assembly, comprising:
  a wheel;
  a ring gear, mounted to and rotatable with the wheel; and
  an interface for connecting the wheel hub to the ring gear to transmit a torque therebetween;
  the interface comprising:
    an array of substantially radially oriented openings, arranged in a substantially circular array around an axis of rotation of the assembly; and
    a plurality of connecting members disposed in the openings, each connector having a substantially radially oriented longitudinal axis, the connecting members being free to move relative to at least one of the wheel hub and the ring gear, to permit relative radial movement between the ring gear and the wheel hub;
  such that torque applied to one of the ring gear or the wheel is transmitted to the other via the connecting members, and the ring gear is substantially isolated from radial deformation of the wheel rim.

The wheel assembly of the invention provides for radial isolation of the ring gear from deformations of the wheel rim while permitting torque to be transmitted through the interface.

The interface may provide a radial clearance on a connection path between the wheel hub and the ring gear.

The interface may comprise a lateral extension to the wheel rim or ring gear, extending in a direction of the axis of rotation of the wheel or ring gear on which it is provided.

The lateral extension may comprise a grow-out provided on at least one of the wheel and the ring gear.

The lateral extension may comprise a series of laterally extending tabs provided on one of the wheel or the ring gear.

The interface may be provided between the lateral extensions and a plurality of tabs provided on one of the wheel rim and the ring gear, the tabs extending in a direction of an axis of rotation of the wheel or the ring gear.

The interface may be provided between:
  one of the wheel and the ring gear; and
  an interface connection member connected to the other of the wheel hub and the ring gear.

The interface connection member may be a separate component of the wheel assembly. The interface connection member may preferably be a brake bar.

The connecting members may be fixed relative to one of the wheel and the ring gear and radially movable relative to the other.

The connecting members may be fixed relative to one of the wheel and the ring gear via screw threads.

The connecting members may be free to move relative to both the wheel and the ring gear.

At least one of the connecting members may provide a resilient connection between the wheel and the ring gear.

A resilient spacer may be disposed on the connection path between the ring gear and the wheel and may itself be disposed between the ring gear and the wheel.

The ring gear may be a roller gear, a sprocket or any other type of drive interfacing component for transmitting drive to or from the wheel having a substantially annular form.

The invention further provides a drive system for an aircraft undercarriage, comprising the wheel assembly of the invention.

Preferably, the drive system is detachably mounted on the landing gear main leg. The drive system can therefore be removed for maintenance and/or when the aircraft is to be used for long range operations where it may not be economic to use the drive transmission due to its weight penalty in cruise.

The drive system may be mounted externally on the landing gear on either the sprung part (e.g. the strut) or on the un-sprung part (e.g. the slider or axle or bogie). The drive system may be pivotally mounted on the landing gear. The output shaft carrying the drive pinion may rotate about a substantially horizontal pivot axis displaced from the axis of rotation of the drive pinion. The ring gear my be one of first and second gears which may move into and out of engagement by rotation about the pivot axis. A motor of the drive system may move with the drive pinion about the pivot axis, or alternatively the motor may be static with respect to the pivot axis, or further alternatively the motor may rotate about the pivot axis as the drive pinion moves through an arc centred on the pivot axis.

The drive pinion and/or the driven gear may include a constant-velocity joint or similar device between the gear and the shaft on which it is rotatably mounted. This can help to ensure that the driving engagement can be maintained as the landing gear deflects.

The landing gear may have only one driveable wheel. Alternatively, two or more of the landing gear wheels may be driven by one or more motors. A differential may be used between the motor(s) and the drive pinions. The motor may be electric or hydraulic, for example.

The gear attached to the wheel preferably has a larger diameter than the drive pinion to develop a significant torque magnifying gear ratio. By making use of the large hub diameter in this way, a mass optimised solution can be achieved.

When incorporated on an aircraft, the landing gear may be used with a power and control system for supplying power to, and controlling operation of, the drive transmission.

BRIEF DESCRIPTION OF THE DRAWINGS

Embodiments of the invention will now be described with reference to the accompanying drawings, in which.

DETAILED DESCRIPTION OF EMBODIMENT(S)

The illustrated embodiments are shown applied to an aircraft landing gear which has two wheels, but the principles of the embodiments may be applied to landing gear with any number of wheels including only a single wheel. The wheel and gear interface of the present invention may be applied in any drive system to engage a corresponding sprocket or pinion. The illustrated embodiment can be applied to a main landing gear (i.e. a landing gear attached to wing structure or fuselage structure in the region of the wings), since the weight supported by the main landing gear is considered to provide the best traction between the wheels and the ground to enable reliable aircraft ground taxiing. However, a drive system incorporating the wheel assembly of the present invention may alternatively be applied to a nose landing gear (i.e. a steerable landing gear towards the nose of the aircraft). The main landing gear shown is applicable to a single aisle passenger airliner (approximately 150-200 pax), although it will be appreciated that this invention has wide applicability to a variety of aircraft types and weights, including civil aircraft, military aircraft, helicopters, passenger aircraft (<50 pax, 100-150 pax, 150-250 pax, 250-450 pax, >450 pax), freighters, tilt-rotor aircraft, etc.

Figure 1:
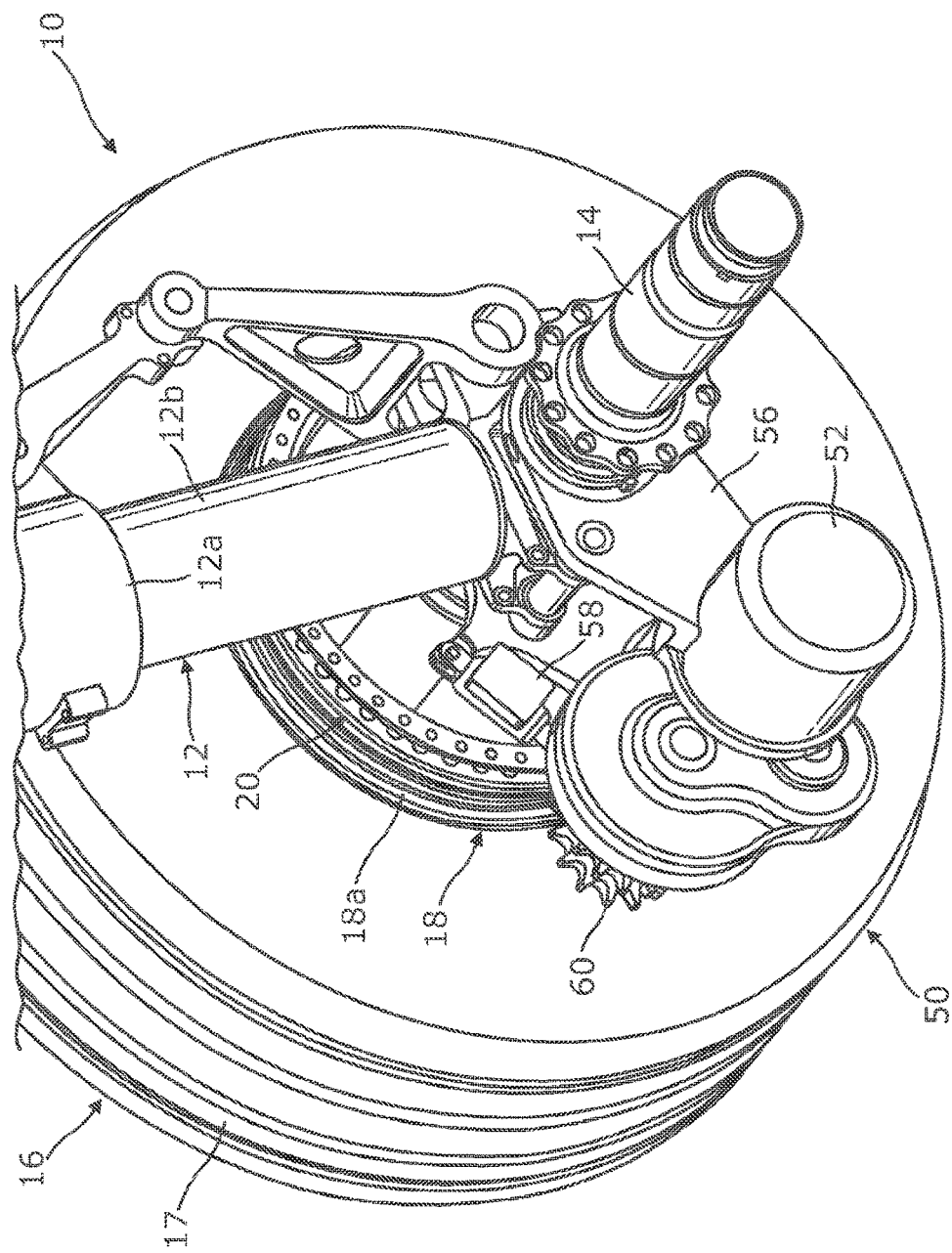
FIG. 1 shows an isometric view of a drive system according to a first embodiment.
Figure 2:
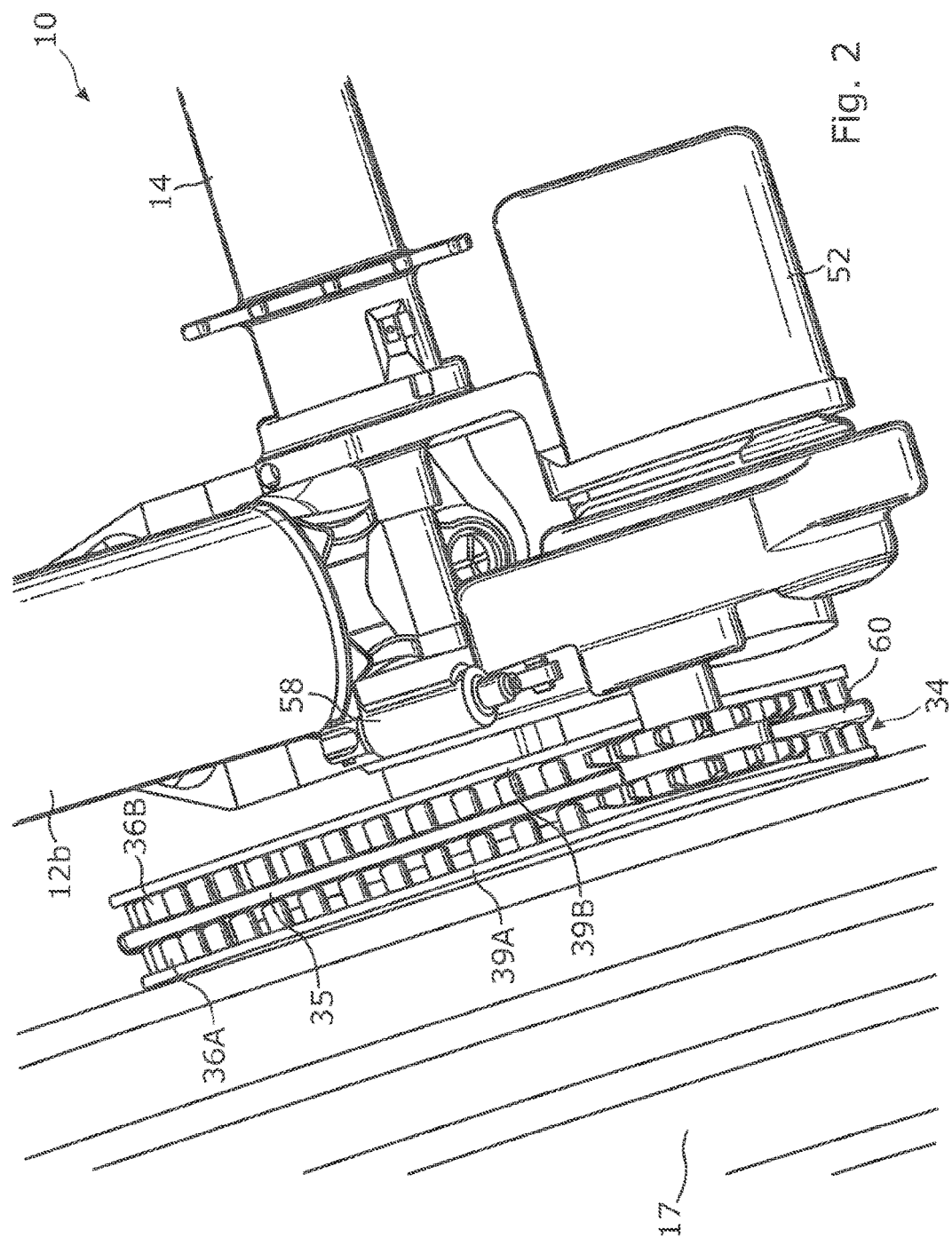
FIG. 2 shows a further isometric view of the drive system of FIG. 1.

The landing gear 10 illustrated in FIGS. 1 and 2 includes a telescopic shock absorbing main leg 12, including an upper telescopic part 12a (main fitting) and a lower telescopic part 12b (the slider). The upper telescopic part 12a is attached to the aircraft fuselage or wing (not shown) by its upper end (not shown). The lower telescopic part 12b supports an axle 14 carrying a pair of wheels 16, one on either side of the main leg (only one wheel 16 is shown in FIGS. 1 and 2, for clarity). The wheels 16 are arranged to rotate about the axle 14 to enable ground movement of the aircraft, such as taxiing or landing.

Each wheel 16 comprises a tyre 17 supported by a hub 18 having a rim 18a at its outer edge which holds the tyre 17. A driven gear 20 is attached to the hub 18 (preferably at the rim 18a) so as to be rotatable with the wheel 16. The driven gear 20 may be attached to the wheel 16 by a plurality of discrete couplings, which may provide a rigid or flexible attachment. Alternatively, the attachment may be via a flange forming a continuous extension rim projecting axially from either the wheel 16 or the driven gear 20.

The drive system 50 includes a motor 52 which transmits torque to a drive shaft 54 via a gearbox 70. The drive system 50 is supported by a bracket 56 which is rigidly connected to the axle 14 of the landing gear. The bracket 56 includes two lugs comprising half moon clamps to permit ready attachment and detachment of the bracket 56 to the axle 14. The motor 52 is fixedly connected, e.g. by bolting, to the bracket 56. The gearbox 70 is pivotally connected to the bracket 56 at pivot lugs 82 on each arm of the bracket 56 disposed either side of the gearbox 70.

A drive pinion 60 is mounted on the drive shaft 54 so as to be rotatable by the drive shaft about a drive axis. The drive pinion 60, drive shaft 54 and gearbox 70 are pivotable by a linear actuator (positioner) 58, such as a direct drive roller screw electro mechanical linear actuator, extends between the bracket 56 (at an end nearest the axle 15) and the gearbox 70, or more particularly the housing 84 of the gearbox. Thus, linear movement of the actuator 58 is translated into rotational movement of the gearbox 70 and the sprockets 60 about the pivot 82. The drive system 50 can therefore be between a neutral configuration (not shown) in which the drive pinion 60 does not mesh with the driven gear 20, and a driven configuration (shown in FIGS. 1, 2 and 3) in which the drive pinion 60 is in meshed engagement with the driven gear 20. In the neutral configuration the wheel 16 is able to rotate freely, e.g. during take-off and landing, while in the driven configuration the wheel 16 can be driven by the drive system 50, e.g. during ground taxiing.

In the embodiment of FIGS. 1 and 2 the driven gear 20 comprises a roller gear 34 and the drive pinion 60 comprises a sprocket. A roller gear is a gear comprising a ring of rollers arranged around its periphery for engaging with teeth of a corresponding gear or sprocket, to transmit drive therebetween.

The illustrated roller gear 34 can be formed by a rigid annular ring 35 and a series of pins projecting from both sides of the annular ring 35 to support the rollers mounted thereto. A first series of rollers 36a rotatably supported by the pins is provided on one side of the annular ring 35, and a second series of rollers 36b rotatably supported by the pins is provided on the other side of the annular ring. Each series of rollers 36a, 36b extends around the annular ring to form a continuous track. First and second lateral annular rings 39a, 39b sandwich the first and second series of rollers 36a, 36b. The pins 38 supporting the first series of rollers 36a extend between the annular ring 35 and the first lateral annular ring 39a, and the pins 38 supporting the second series of rollers 36b extend between the annular ring 35 and the second lateral annular ring 39b. The annular ring 35 therefore forms a central spine for supporting the pins which are cantilevered off the central spine. The annular ring 35 can comprise a plurality of axially extending connection extension tabs (not shown) providing mounting means for mounting the roller gear 34 to the hub 18. The annular rings 35, 39a and 39b therefore act as roller mounting members for mounting the rollers on the roller gear. Other mounting means according to the invention, as will be described in greater detail in the following can be used to mount the roller gear 34 to the hub 18.

The drive pinion 60 comprises a sprocket having two coaxial rings of radially extending sprocket teeth which can interlock with the rollers 36 of roller gear 34. That is, each ring of sprocket tee is arranged to mesh with one of the rings of rollers of the driven gear 20.

Figure 3:
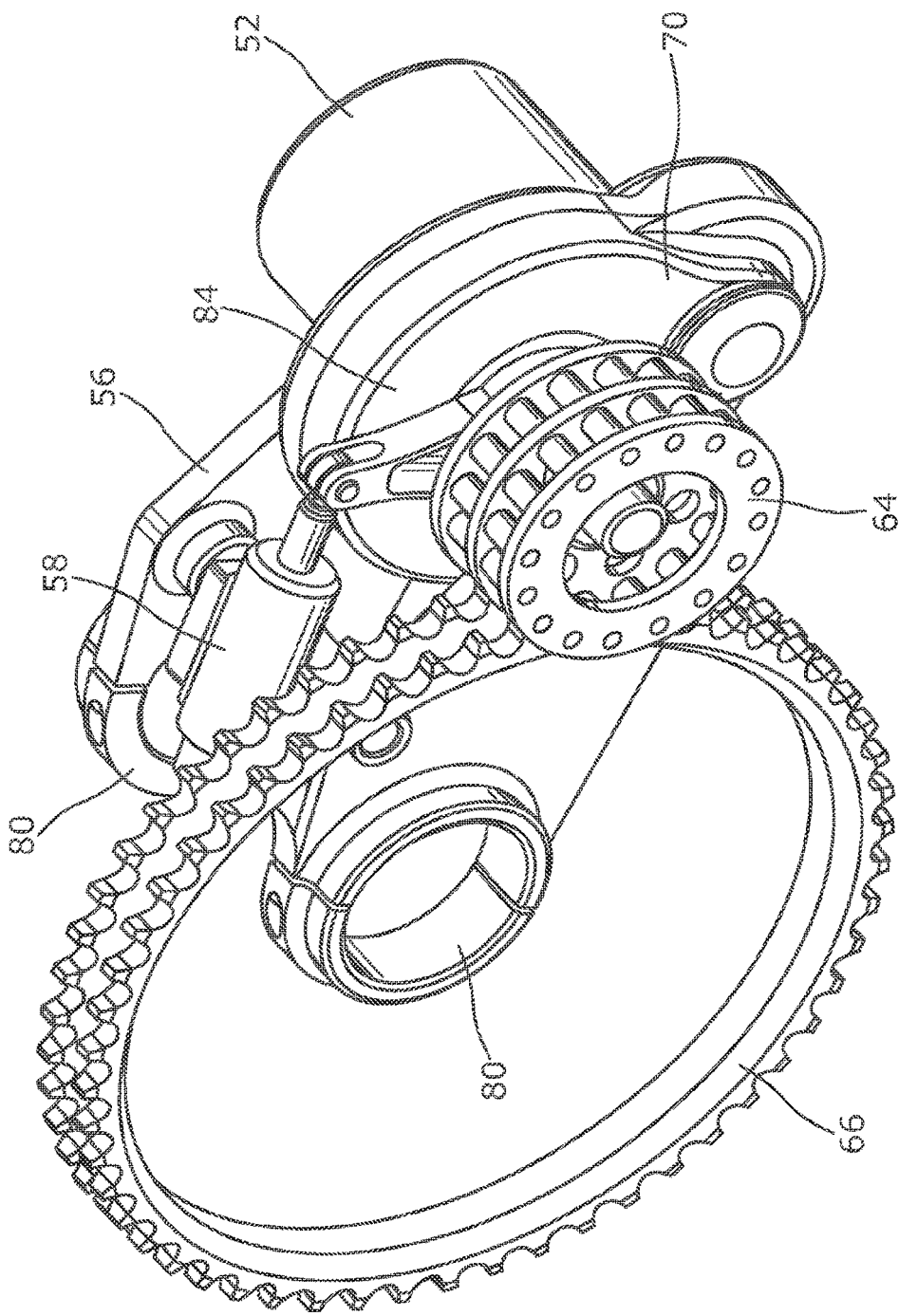
FIG. 3 shows an isometric view of selected components of a drive system according to a second embodiment.

FIG. 3 shows an alternative, and preferred, embodiment in which the driven gear 20 comprises a sprocket instead of a roller gear, and the drive pinion comprises a roller gear instead of a sprocket. Thus, the drive pinion comprises a roller gear 64 having two coaxial rings of rollers and the driven gear 20 is replaced by sprocket 66 having two coaxial rings of sprocket teeth. In all other respects the drive system is identical to that described above with reference to FIGS. 1 and 2, and the features of the drive system described below apply equally to both embodiments. The roller gear 64 may be constructed similarly to the roller gear 34, although of course it has a much smaller diameter and therefore fewer rollers.

An advantage of the sprocket-roller gear arrangement is that it is more tolerant of wheel and axle deformation than meshing toothed gear arrangements. Landing gear wheels and axles are subject to high loads and consequential deformation during ground taxiing, and a driven gear fixed to the wheel will inevitably deform in response to such deformation. Meshing toothed gears are intolerant of such deformation and a typical toothed rim gear may need to be isolated from the wheel via bearings, a flexible interface, or similar. In contrast, the sprocket and roller arrangement of the present invention may be able to tolerate the deformation without such modification.

Such an arrangement also has the advantage of being lightweight and having high structural strength. The main failure mode of the rollers is via shear failure of the pins; by mounting each roller directly on its respective pin, with no intermediate sleeve, bush or other part, the diameter of the pin can be maximised to maximise shear strength.

In variations to the embodiments described above, the drive pinion may be formed as a sprocket having a single row of teeth, and the driven gear may be formed as a roller gear having a single row of rollers. In a further variation, the drive pinion may alternatively comprise a single ring of rollers for engaging with a driven gear formed as a sprocket (not shown) having a single row of sprocket teeth.

Although the figures only show features of the drive system 50 for driving one of the wheels 16, it is envisaged that these features may be mirrored for the other wheel 16. That is, it is envisaged that one drive system 50 may be provided for each wheel 16. For a landing gear 10 with four or more wheels 16, a drive system 50 may be provided for each of the wheels 16, or for only two of them. In embodiments in which only two of the wheels 16 are provided with drive systems 50, it may be necessary to provide further motors (not shown) to achieve pre-landing spin-up of the un-driven wheels, with ground taxiing being accomplished by the two drive systems 50. In other embodiments it may be possible to have one motor 52 shared between two drive systems 50.

Although the figures only show the drive system 50 supported by a bracket 56 which is rigidly connected to the axle 14 of the landing gear, the drive system 50 may alternatively be mounted on the upper telescopic part 12a (main fitting) or lower telescopic part 12b (slider).

Figure 5:
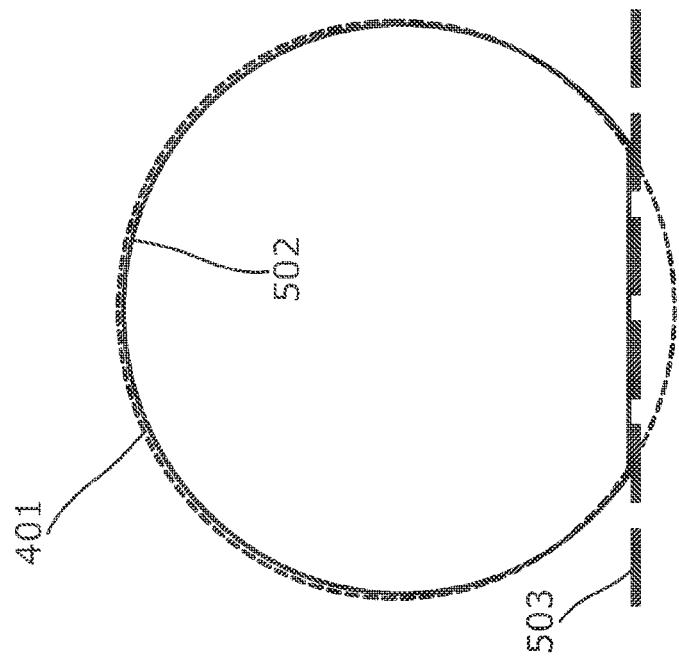
FIGS. 4 and 5 show schematic illustrations of deformation modes of a wheel rim under load.
Figure 4:
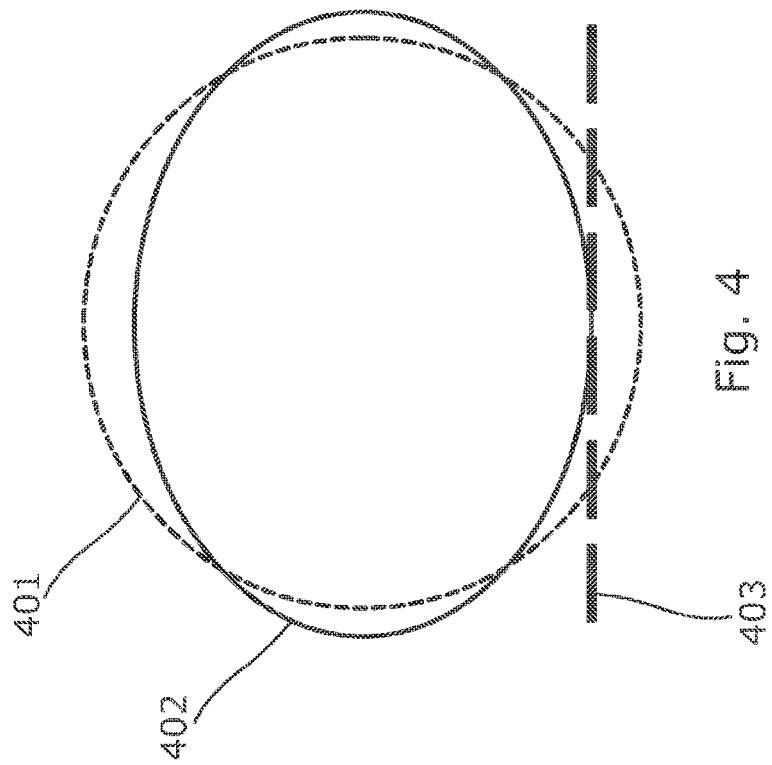

FIGS. 4 and 5 schematically illustrate different modes of deformation which can occur when a vehicle, in particular an aircraft, is carried by a wheel. Dashed line 401 illustrates a nominal wheel rim circumference when no load is applied. Solid line 402 illustrates the phenomenon of "ovalisation", which can occur when significant weight is applied to a wheel at its axle, and reacted by the ground 403. Now considering the case where the ring gear illustrated in FIGS. 1 to 3 is fixedly attached to the rim of the hub of the wheel, it can be seen that the ring gear will also deform with the wheel rim of the wheel. Such deformations can change the radial distance from the axle 14 of the wheel to the periphery of the ring gear 20 of FIG. 1. This can therefore cause variations in the required distance at which pinion gear 60 must be held from the axle 14 in order to properly mesh with the ring gear 20. There is therefore a need to address this problem of ovalisation of the wheel hub.

FIG. 5 schematically illustrates a different deformation case, where again, dashed circle 401 illustrates a nominal form of a wheel rim in an un-loaded state. The solid line 502, illustrates, in an exaggerated schematic manner, how a wheel hub can deform under significant loading. As illustrated, a degree of flattening can occur at the bottom edge near the ground 503 and this can also cause a slight deformation at the upper side of the wheel rim, where it can be seen that the solid line 502 is slightly below the dashed line 401.

Further, the wheel assembly will often be subject to heat cycles. This can be due to ambient temperature changes, and also due to heat generated by braking assemblies held in the wheel, or mounted thereto. When braking a vehicle, brakes convert kinetic energy to heat energy and so the wheel and surrounding components can be caused to increase in temperature. The temperature cycles can be especially large in aircraft, since at cruising heights, the landing gear will generally be at very low temperatures, well below freezing, and once the aircraft lands, then a large amount of heat is generated by braking the aircraft due to its large size and speed, which combine to result in a high level of kinetic energy to convert to heat and disperse from the braking system. This can lead to large changes in temperature of all components in the wheel assembly during normal use. These changes in temperature cause components to expand or contract and where different materials are used, then the components may change in dimensions by differing amounts, causing additional stresses in the components when they are fixedly connected. The wheel may be formed from lightweight alloys to minimise weight, while the gears or sprockets mounted to the wheel may be formed of higher strength alloys or metals, such as steel, for example. Thermal expansion can therefore cause stresses in these components when they are fixedly connected to one another.

In seeking to address these issues, the inventors have devised a novel interface for connecting a ring gear to a wheel hub.

Figure 6:
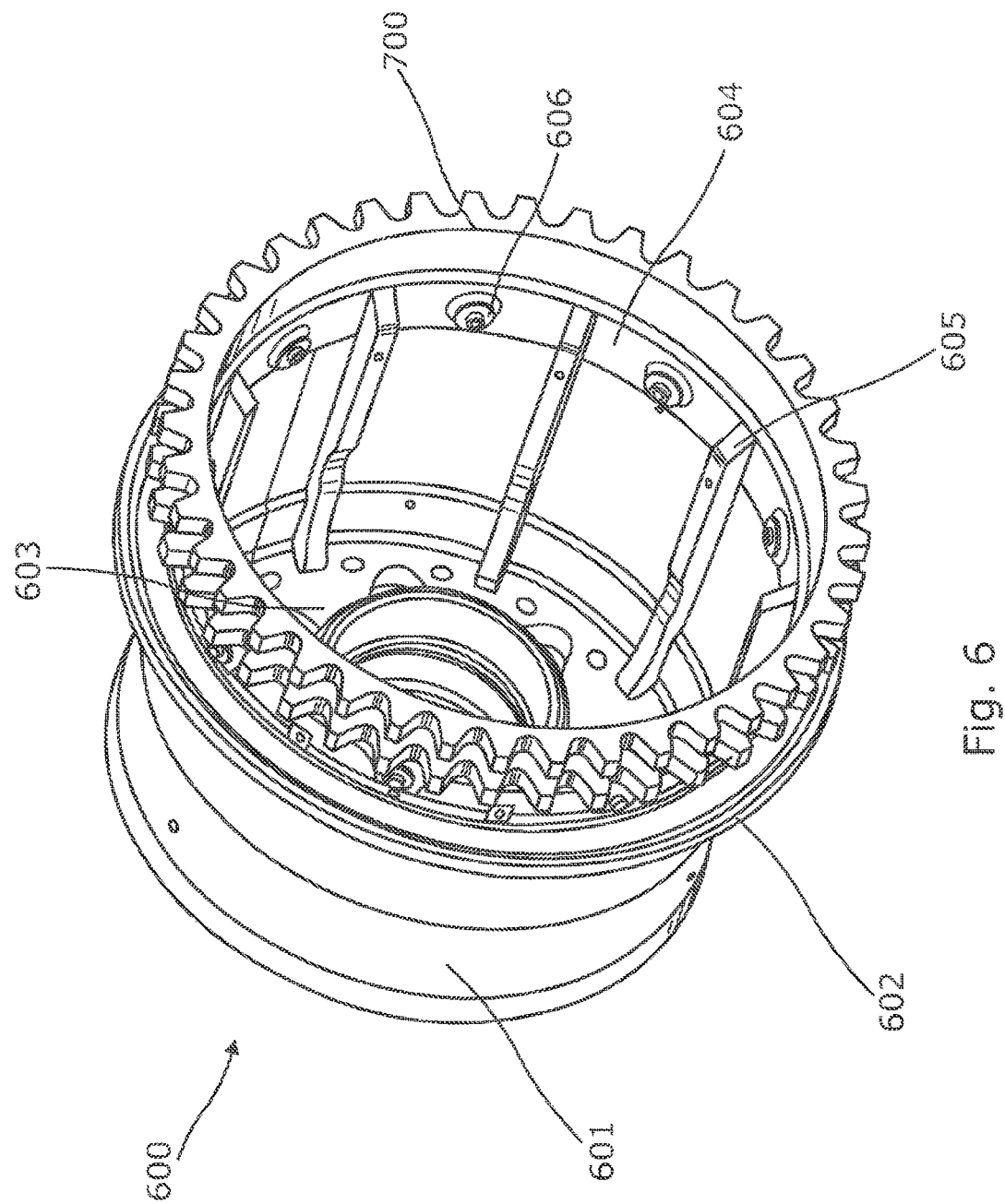
FIG. 6 shows ring gear mounting arrangement according to the invention.

A wheel hub assembly comprising such a novel interface is illustrated in FIG. 6. The assembly 600 includes a wheel 601, which comprises a wheel rim 602, which is configured to carry a tyre. The rim 602 is arranged around a central hub portion 603 and, as illustrated schematically in FIGS. 4 and 5, when a load is applied to the wheel rim 602 via a tyre, from the ground, then the opposing force, transmitted via an axle to which the wheel is mounted and via central hub portion 603, can cause deformation of the wheel rim 602. A ring gear 700 is mounted to the wheel 601, which comprises wheel rim 602 and a central wheel hub 603.

To isolate the ring gear 700 from deformation, in a radial direction, of the wheel rim 602, a radial clearance can be provided in an interface connecting the ring gear 700 to the wheel rim 602. In the illustrated embodiment, this is provided by creating an internal diameter of the ring gear 700 which is greater than an outer diameter of a flange or extended portion 604 of the wheel rim. This creates a certain amount of radial free movement or "play" between the extension 604 and the ring gear 700. In this way, an interface providing a radial clearance, or freedom of relative radial movement, can be provided, connecting the wheel and the ring gear. The illustrated flange 604, is provided as a 'grow-out', or lateral extension of the wheel rim 602. This extension or 'grow out' extends in a direction substantially parallel to the rotational axis of the wheel. With such a clearance provided between interfacing parts connecting the ring gear 700 to the wheel 601, it is necessary to provide features which can transmit a torque between the wheel 601 and the ring gear 700. Such a torque must be provided in order to allow a drive input provided to the ring gear to be transmitted to the wheel to drive a vehicle to which the wheel assembly is fitted. Conversely, if the ring gear 700 is used for braking purposes, then it is necessary to transmit an opposing, braking, torque from the ring gear to the wheel 601 to brake the vehicle or aircraft to which the wheel is fitted.

The interface of the present invention provides for the transmission of torque by providing, in at least one of the ring gear 700 and the wheel 601, an array of openings, which are arranged in a substantially circular array around an axis of rotation of the ring gear or wheel, and a plurality of corresponding connecting members disposed in the openings, and free to move relative to the openings. Each connector is oriented with a substantially radial longitudinal axis and is free to move along that axis relative to the opening in which it is disposed, so that movement either of the opening or of the connector, in a radial direction relative to the axis of rotation of the wheel or ring gear, is not transmitted to the other.

In the arrangement illustrated in FIG. 6, a plurality of openings are provided in the flange 604, with a plane of the opening being substantially perpendicular to a radius of the wheel and an axis passing through the opening being substantially radial with respect to the wheel. This arrangement of the openings is termed a radial orientation, since an axis passing through the openings is radial relative to the wheel or ring gear; these openings are considered radially oriented with respect to the wheel or ring gear.

To prevent the connecting members located in the openings 606 from being dislodged or falling out during use, the connecting members and the openings can be provided with threads to retain the connecting members in the openings 606. In an alternative arrangement, the connecting members may be free to translate through the openings 606 while threads may be provided on the ring gear 700 to connect the connecting members to the ring gear 700. In a further alternative, the connecting members may be free to slide through openings in both the ring gear 700 and the wheel 601. To retain the connecting members from falling out or being dislodged from the openings, the connecting members may, in this case, be provided with retaining means provided at each end, or between the wheel and ring gear, to movably retain them in the openings and prevent them from falling through the openings.

Figure 7:
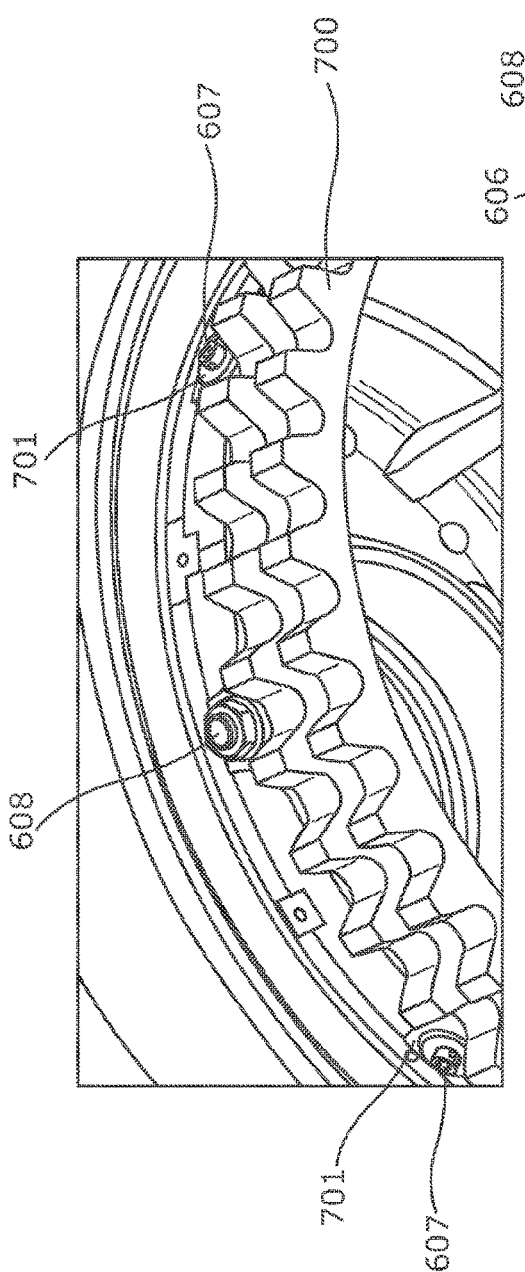
FIGS. 7 and 8 show detail of the arrangement of FIG. 6.

FIG. 7 illustrates further detail of the arrangement of FIG. 6. Here it can be seen that the connecting members 607 are located in tabs 701 extending laterally from the ring gear 700, extending laterally meaning extending in a direction of the axis of rotation of the ring gear 700. The arrangement could also be reversed, in that a flange equivalent to the flange 604 may be located on the ring gear 700 instead of on the wheel 601 and tabs equivalent to the tabs 701 could be provided on the wheel 601, preferably at its rim 602, to provide the necessary engagement via connecting members 607.

As an optional feature, one or more fixed or resilient retaining means may be provided in one or more of the openings, as illustrated by the nut and screw thread component 608 shown in FIG. 7. This may be beneficial because, in the absence of any fixed or resilient connection points, the ring gear 700 may have excessive freedom to move relative to the wheel 601 and may vibrate or rattle excessively. Therefore, a substantially fixed connection at at least one point 608 on the circumference of the ring gear and the wheel assembly, or at more than one point on the assembly, may be beneficial. However, configuring this fixed connection as a completely rigid assembly may remove some or all of the benefits of the radial displacement which is enabled by the free radial movement of connectors 607. Therefore, the connecting assembly 608 may incorporate a resilient component in the connection path between the ring gear and the wheel. This can allow radial displacement when a certain load is applied, so as to enable displacement of the ring relative to the wheel rim at the point of the connector 608 at high loads. Such a high loading may be that induced by deformation of the wheel rim due to the loading examples illustrated in FIGS. 4 and 5. Such a configuration may also resist significant movement under light loading, such as that induced due to vibration or rotation of the wheel alone, to prevent excessive vibration or rattling of the ring gear 700 on the wheel 601.

Figure 8:
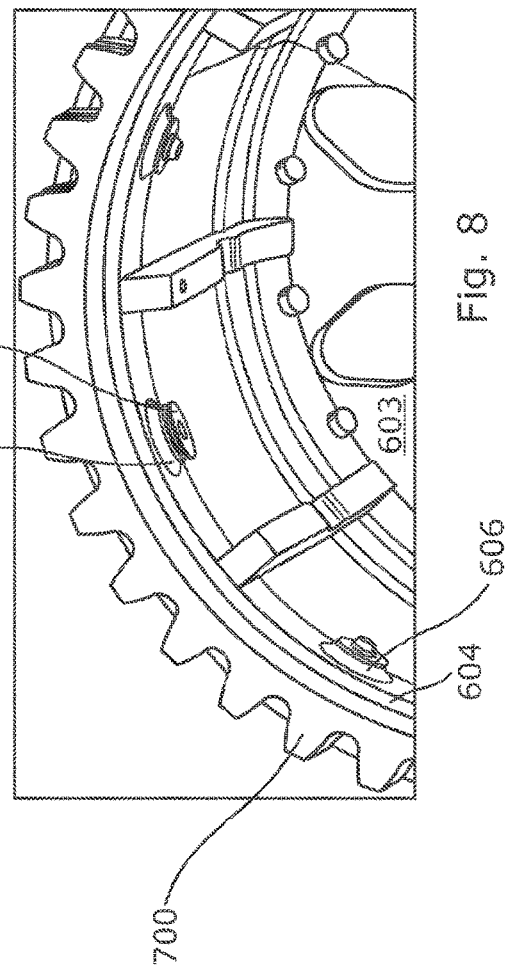

FIG. 8 illustrates further detail of the assembly of FIG. 6 with the fixed connection 608 illustrated from below, where a head of the threaded element can be seen engaging the opening 606, through which the threaded element passes. A resilient member may be located between the connector 608 and the opening 606 to allow some resilient displacement in that connection between the wheel rim and the ring gear.

Figure 9:
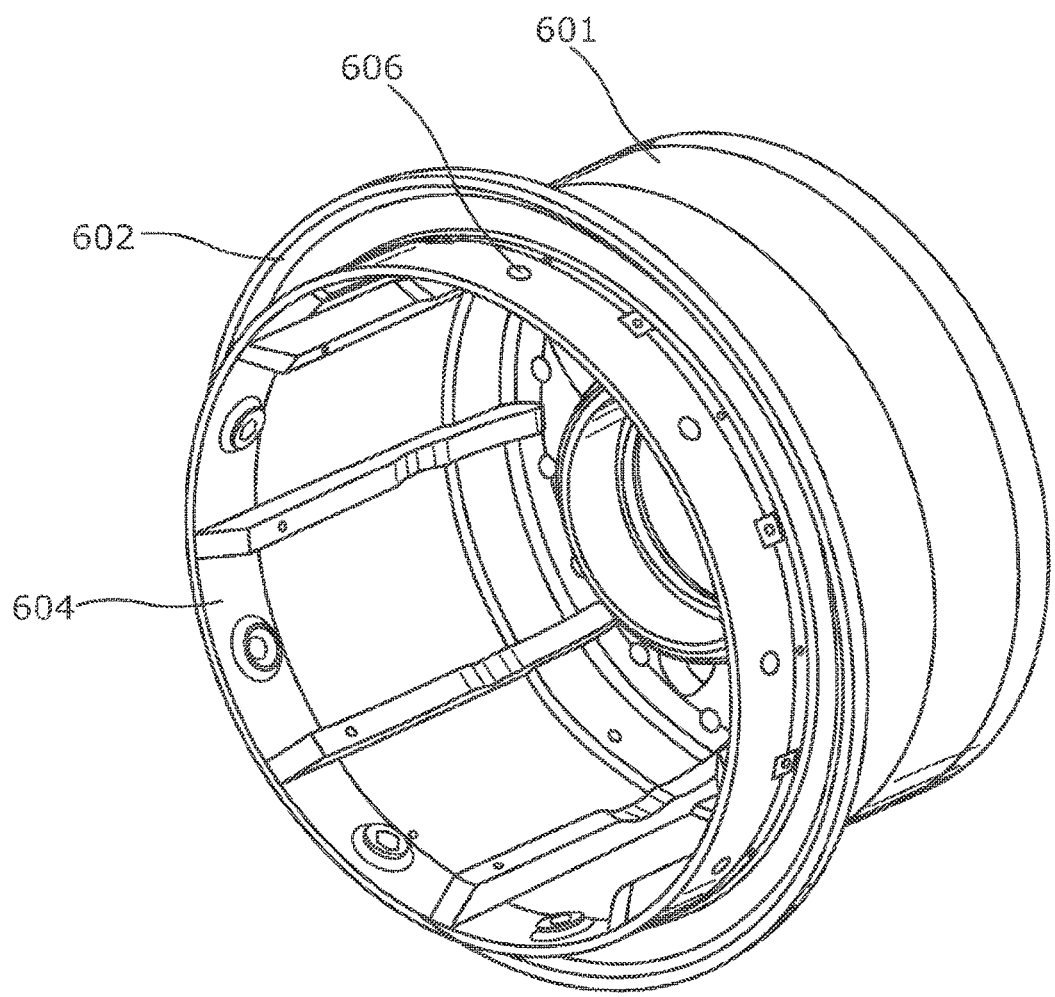
FIG. 9 shows a wheel hub for the present invention.

FIG. 9 illustrates a wheel 601 of the present invention, where the flange 604 can be seen without the ring gear 700 mounted to it, so that the locations of openings 606 can be more clearly seen, and the form of the grow-out, or lateral extension, created to provide the flange 604 on the wheel rim 602 can also be seen.

Figure 10:
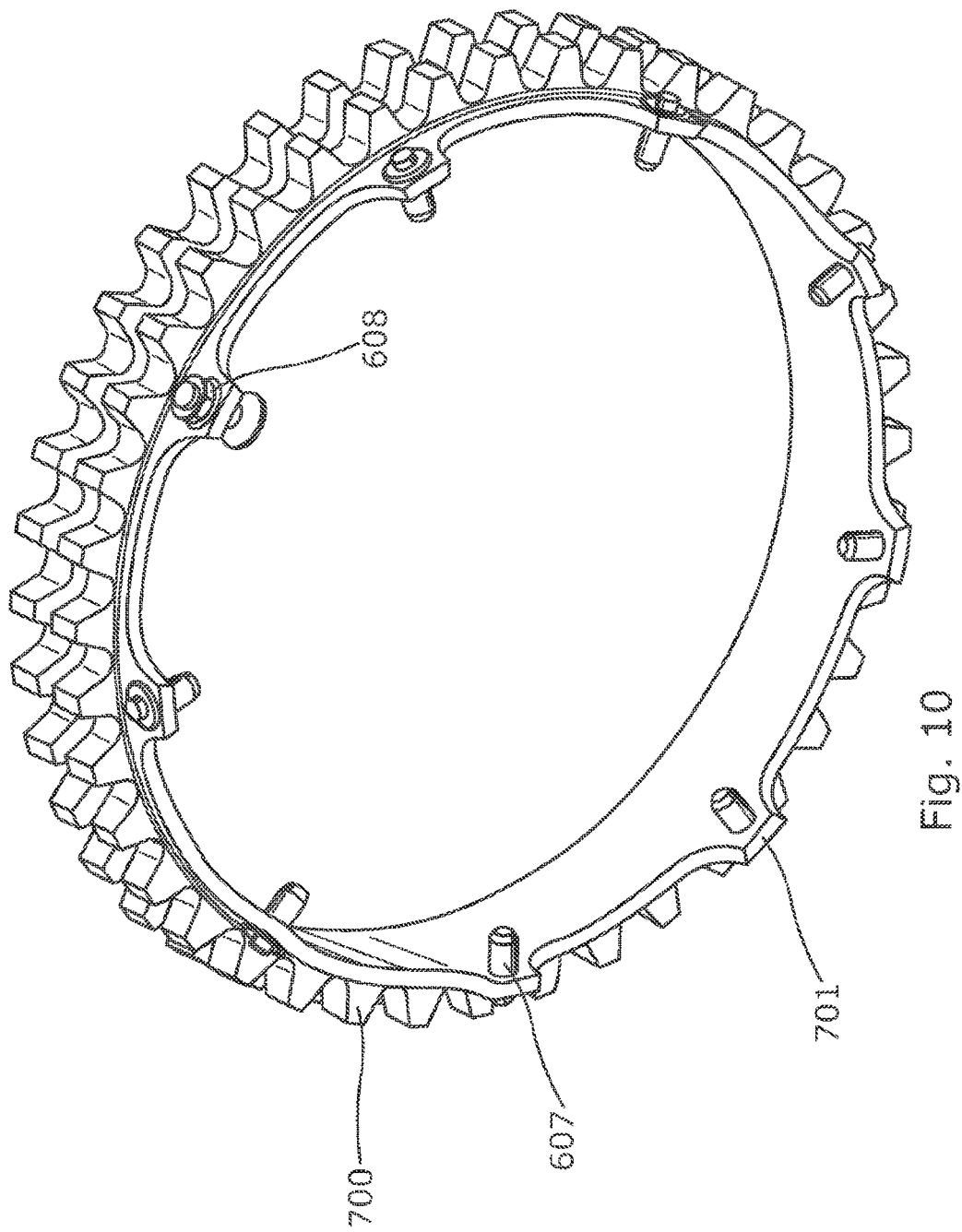
FIG. 10 shows a ring gear for the present invention.

The desired radial clearance or 'play' provided by the interface of the invention can be provided in the manner illustrated in the described embodiments, between the internal diameter of the ring gear 700 and an external diameter of the flange 604, but can also be provided by alternative arrangements. The desired radial freedom of movement can be provided between any interfacing parts which provide a connection between the ring gear and the wheel 601, and need not necessarily be provided at the internal diameter of the ring gear 700, nor necessarily at the external diameter of the flange 604. There may alternatively be provided a series of tabs or extensions extending from the wheel rim, or alternatively extending from other features of the wheel. Connection features of the interface may be connected to intermediate features such as ribs 605, or other components mounted to the wheel rim or to the ribs 605, or to the hub 603. A common component of a wheel assembly of an aircraft which may provide this connecting function is a brake bar for carrying brake components of the wheel assembly. A connecting member for providing the interface of the invention may therefore be connected to a brake bar of a wheel assembly, or alternatively to another intermediate member of the wheel assembly FIG. 10 illustrates a ring gear 700 of the present invention, with connecting members 607 located in openings in the tabs 701 provided on the ring gear. As illustrated in FIGS. 7 and 8, one fixed connector member 608 is located in one of the openings and can include a resilient member to provide a resilient connection between the ring gear 700 and the wheel 601.

Figure 11:
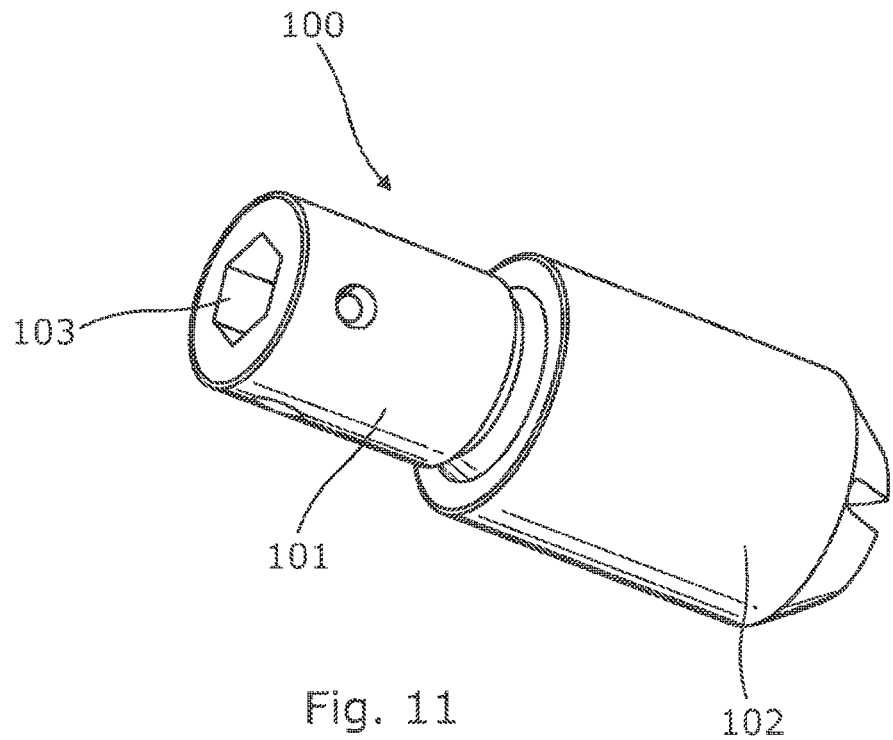
FIGS. 11 and 12 show a ring gear connection member for the present invention.
Figure 12:
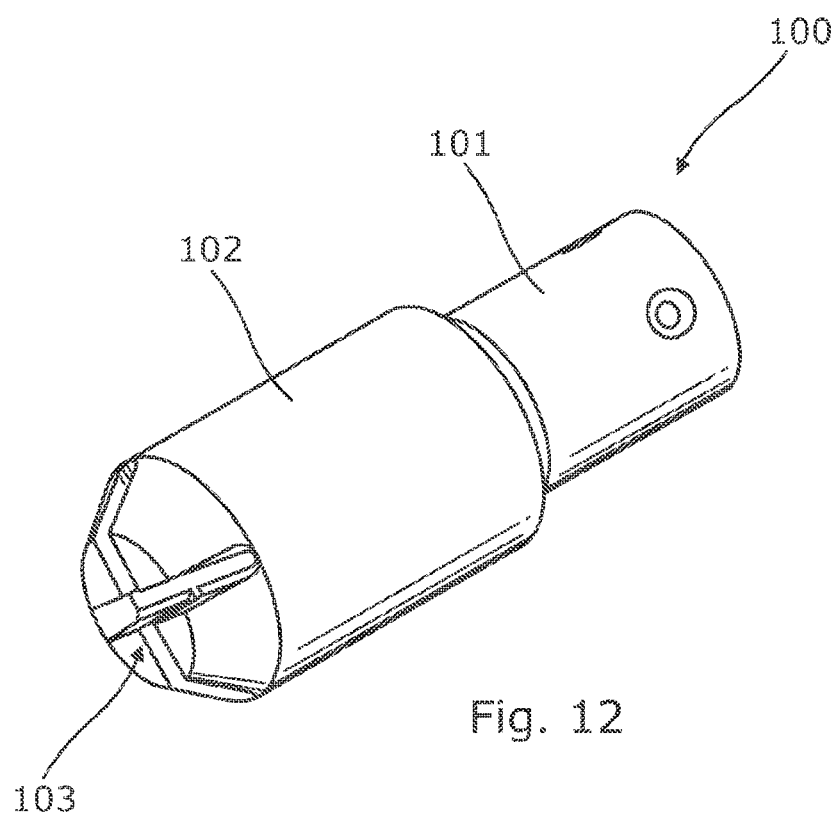

FIGS. 11 and 12 show an example of a connector member which can be used in the assembly of the illustrated embodiment. The connector member 100 has a first portion 101, for location in an opening of the ring gear, and a second portion 102, for location in the openings of the wheel rim. One or the other of the first 101 and second 102 portions may be provided with a thread for engagement with a corresponding thread of an opening or cavity in which it is to be located. A rotational drive feature 103 may be provided to allow a tool to be inserted into the connector member to rotate it for engagement with threads of the corresponding opening or cavity in which it is to be fixedly attached. Whichever portion 101 or 102 is not threaded can be provided with a smooth outer surface and a small clearance fit may be provided between it and the opening in the corresponding ring gear or wheel, so that the connector member can translate along its longitudinal axis relative to the opening in which it is received, to provide the desired isolation of the ring gear from deformation of the wheel hub. In FIG. 12, a further alternative drive feature can be seen, for receiving a planar or cross-headed tool or screwdriver for rotating the connector member.

Figure 13:
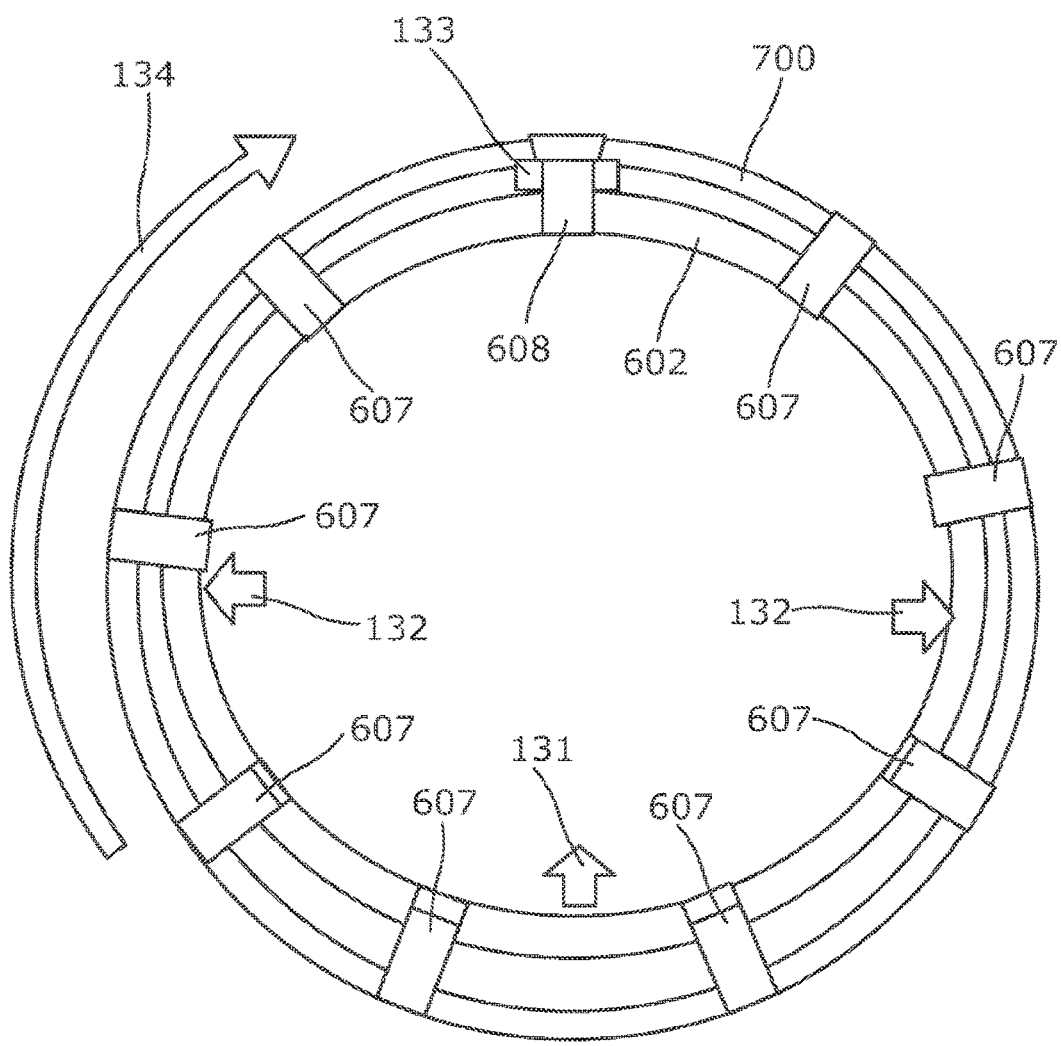
FIG. 13 shows a schematic illustration of the fit of the interface wheel assembly of the invention.

FIG. 13 shows a schematic illustration of how the invention functions to isolate the ring gear 700 from deformations in the wheel rim 602. A load acting in the direction of arrow 131 causes the wheel rim to be compressed in the direction of that load and so the sides of the wheel hub bow outwardly in the direction of arrows 132. In this illustration the connecting members 607 are connected to the ring gear 700 and are free to move inwardly and outwardly in openings connected to, or formed in, the wheel rim 602. In this way, the rim 602 can deform and the gear 700 is substantially unaffected by that deformation. A torque in a direction of, or opposite to, arrow 134 can therefore be transferred between the ring gear 700 and the wheel rim 602. One or more resilient spacers 133 may be located on the connection path between the ring gear and wheel rim to prevent excessive movement of the ring gear under low loading levels, to prevent unnecessary rattling or vibration as described above. Connecting members 607 may have an elongate form and may be, as illustrated in the previous figures, substantially cylindrical, having a circular outer profile. One or more of the connecting members may be integrally formed with the gear and/or the wheel.

A further degree of freedom can be provided by mounting one end of both ends of one or more of the connecting members in a spherical bearing, commonly referred to as a 'rose joint'. This can allow the connecting members some angular deflection, as well as the longitudinal deflection along their longitudinal axes described above, with respect to the ring gear and/or wheel, depending upon where the spherical bearing or rose joint is located.

It will therefore be appreciated that the clearance, or freedom of radial movement, provided by the interface of the present invention can be provided between a flange and a corresponding set of tabs or extensions provided on the wheel and ring gear of the invention. It can alternatively be provided between intermediate components attached to the wheel and/or ring gear, or could further be provided between a pair of flanges or extensions 604 provided on each of the ring gear and wheel hub. The radially oriented openings, provided with connecting members which can translate relative to at least one of the two components, allows the radial isolation of the ring gear from radial deformation of the wheel hub. Torque can be transmitted between the wheel hub and the ring gear by creating a shear force in the radially oriented connecting members connecting the two components. Although openings passing entirely through the components are described in the Figures, suitable openings may be cavities which allow for longitudinal movement of the connecting members in the cavities.

In each of the arrangements described above the principle of achieving drive via meshing between a sprocket and roller gear/roller chain can be applied when the driven gear comprises the sprocket and the drive pinion comprises the roller gear/roller chain, and vice versa.

Although the invention has been described above with reference to one or more preferred embodiments, it will be appreciated that various changes or modifications may be made without departing from the scope of the invention as defined in the appended claims.

The invention claimed is:
1. A wheel assembly, comprising:
a wheel;
a ring gear, mounted to and rotatable with the wheel; and
an interface for connecting the wheel hub to the ring gear to transmit a torque therebetween;
the interface comprising:
an array of substantially radially oriented openings, arranged in a substantially circular array around an axis of rotation of the assembly; and
a plurality of connecting members disposed in the openings, each connector having a substantially radially oriented longitudinal axis, the connecting members being free to move relative to at least one of the wheel hub and the ring gear, to permit relative radial movement between the ring gear and the wheel hub;

such that torque applied to one of the ring gear or the wheel is transmitted to the other via the connecting members, and the ring gear is substantially isolated from radial deformation of the wheel rim.

2. A wheel hub assembly according to claim 1, wherein the interface provides a radial clearance on a connection path between the wheel hub and the ring gear.

3. A wheel hub assembly according to claim 1, wherein the interface comprises a lateral extension to the wheel rim or ring gear, extending in a direction of the axis of rotation of the wheel or ring gear on which it is provided.

4. A wheel hub assembly according to claim 3, wherein the lateral extension comprises a grow-out provided on at least one of the wheel and the ring gear.

5. A wheel hub assembly according to claim 3, wherein the lateral extension comprises a series of laterally extending tabs provided on one of the wheel or the ring gear.

6. A wheel assembly according to claim 3, wherein the interface is provided between the lateral extensions and a plurality of tabs provided on one of the wheel rim and the ring gear, the tabs extending in a direction of an axis of rotation of the wheel or the ring gear.

7. A wheel hub assembly according to claim 1, wherein the interface is provided between:
one of the wheel and the ring gear; and
an interface connection member connected to the other of the wheel hub and the ring gear.

8. A wheel assembly according to claim 7, wherein the interface connection member is a separate component of the wheel assembly.

9. A wheel assembly according to claim 7, wherein the interface connection member is a brake bar.

10. A wheel assembly according to claim 1, wherein the connecting members are fixed relative to one of the wheel and the ring gear and radially movable relative to the other.

11. A wheel hub assembly according to claim 10 wherein the connecting members are fixed relative to one of the wheel and the ring gear via screw threads.

12. A wheel assembly according to claim 1, wherein the connecting members are free to move relative to both the wheel and the ring gear.

13. A wheel hub assembly according to claim 1, wherein at least one of the connecting members provides a resilient connection between the wheel and the ring gear.

14. A wheel hub assembly according to claim 13, comprising a resilient spacer disposed on the connection path between the ring gear and the wheel.

15. A wheel hub assembly according to claim 1, wherein the ring gear is a roller gear, a sprocket or any other type of drive interfacing component for transmitting drive to or from the wheel.

16. A drive system for an aircraft undercarriage, comprising the wheel assembly of claim 1.

17. An aircraft, comprising the wheel assembly or drive system of claim 1.

18. A drive system according to claim 16, wherein the drive system is supported by a bracket which is rigidly connected to an axle, main fitting or slider part of a landing gear.

19. A drive system according to claim 18, wherein the bracket includes two lugs comprising half-moon clamps to permit ready attachment and detachment of the bracket.

* * * * *